(12) United States Patent
Igawa et al.

(10) Patent No.: US 7,438,730 B2
(45) Date of Patent: Oct. 21, 2008

(54) METHOD OF PRODUCING IRON OXIDE PELLETS

(75) Inventors: Yasuhiko Igawa, Kobe (JP); Jun Jimbo, Kobe (JP); Hidetoshi Tanaka, Kobe (JP); Shoichi Kikuchi, Kobe (JP); Takao Harada, Kobe (JP); Osamu Tsuchiya, Kobe (JP); Shuzo Ito, Kobe (JP); Isao Kobayashi, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 0 days.

(21) Appl. No.: 11/378,269

(22) Filed: Mar. 20, 2006

(65) Prior Publication Data

US 2006/0218753 A1 Oct. 5, 2006

Related U.S. Application Data

(63) Continuation of application No. 10/778,344, filed on Feb. 17, 2004, now abandoned, which is a continuation-in-part of application No. 10/445,043, filed on May 27, 2003, now Pat. No. 6,811,759, which is a continuation of application No. 10/192,720, filed on Jul. 11, 2002, now Pat. No. 6,579,505, which is a continuation of application No. 09/175,481, filed on Oct. 20, 1998, now abandoned.

(30) Foreign Application Priority Data

Oct. 30, 1997 (JP) .................................. 09-298479

(51) Int. Cl.
C01B 31/14 (2006.01)
(52) U.S. Cl. ....................................... 23/314; 23/313 R
(58) Field of Classification Search ............... 23/313 R, 23/314; 423/594.1, 414, 592.1
See application file for complete search history.

(56) References Cited

U.S. PATENT DOCUMENTS

| | | | |
|---|---|---|---|
| 3,443,931 A | 5/1969 | Beggs et al. |
| 3,836,354 A | 9/1974 | Wienert |
| 3,844,811 A | 10/1974 | Brynko |
| 3,942,974 A | 3/1976 | Moreau et al. |
| 4,025,596 A | 5/1977 | Parks et al. |
| 4,161,501 A | 7/1979 | Skretting |
| 4,219,519 A | 8/1980 | Goksel |
| 4,385,928 A | 5/1983 | Clevely |
| 5,000,783 A | 3/1991 | Dingeman et al. |
| 5,112,391 A | 5/1992 | Owen et al. |
| 5,186,741 A | 2/1993 | Kotraba et al. |
| 5,302,186 A | 4/1994 | Field et al. |
| 5,972,066 A | 10/1999 | Lehtinen |
| 5,989,019 A | 11/1999 | Nishimura et al. |
| 6,063,156 A | 5/2000 | Negami et al. |
| 6,129,777 A | 10/2000 | Fuji et al. |
| 6,149,709 A | 11/2000 | Uragami et al. |
| 6,152,983 A | 11/2000 | Kamijo et al. |
| 6,241,803 B1 | 6/2001 | Fuji |
| 6,251,161 B1 | 6/2001 | Tateishi et al. |
| 6,254,665 B1 | 7/2001 | Matsushita et al. |
| 6,258,149 B1 | 7/2001 | Sugiyama et al. |
| 6,296,479 B1 | 10/2001 | Nishimura et al. |
| 6,319,302 B1 | 11/2001 | Harada |
| 6,334,883 B1 | 1/2002 | Takenaka et al. |
| 6,368,379 B1 | 4/2002 | Tateishi et al. |
| 6,579,505 B2 | 6/2003 | Tsuchiya et al. |
| 2002/0175441 A1 | 11/2002 | Tsuchiya et al. |
| 2003/0198779 A1 | 10/2003 | Tsuchiya et al. |

FOREIGN PATENT DOCUMENTS

| | | |
|---|---|---|
| DE | 26 07 650 | 9/1977 |
| EP | 0 413 592 | 2/1991 |
| GB | 1 364 150 | 8/1974 |
| JP | 36-17603 | 9/1961 |
| JP | 45-19569 | 7/1970 |
| JP | 49-15522 | 4/1974 |
| JP | 60-220135 | 11/1985 |
| WO | WO 94/03648 | 2/1994 |

OTHER PUBLICATIONS

Derwent Abstracts, AN 92-157793, JP 2-090841, Jun. 7, 1991.
Derwent Abstracts, AN 95-335296, JP 2-090842, Mar. 20, 1995.
Derwent Abstracts, AN 75-50151, JP 50-041711, Apr. 16, 1975.

*Primary Examiner*—Edward M Johnson
(74) *Attorney, Agent, or Firm*—Oblon, Spivak, McClelland, Maier & Neustadt, P.C.

(57) ABSTRACT

A method for producing an iron oxide pellet including the steps of adding water to a raw material mixture comprising iron oxide which serves as a primary component, a carbonaceous material in an amount sufficient for reducing the iron oxide, an organic binder in an amount sufficient for binding the iron oxide and the carbonaceous material, and an inorganic coagulant in an amount of not less than 0.05 mass % and less than 1 mass %; pelletizing the resultant mixture to thereby obtain a green pellet; and drying the green pellet until the moisture content is reduced to equal to or less than 1.0 mass %. The thus-produced iron oxide pellet is charged in a reducing furnace for reduction to thereby obtain a reduced iron pellet.

18 Claims, 14 Drawing Sheets

FIG. 1

| | | Iron ore | | | | | mass% |
|---|---|---|---|---|---|---|---|
| | T.Fe | Fe₂O₃ | FeO | SiO₂ | Al₂O₃ | Moisture | Grain size (-75 μm) |
| | 67.9 | 96.83 | 0.28 | 1.02 | 0.54 | 8 | 71.00 |

| | Coal | | | | | |
|---|---|---|---|---|---|---|
| | Fixed carbon | Volatile component | Ash | Moisture | Grain size (-75 μm) | |
| Inventive Samples 1 and 2 | 74.00 | 16.40 | 9.60 | 7.00 | 50 - 70 | |
| Inventive Samples 3 and 4 | 72.20 | 18.40 | 9.40 | 7.20 | 50 - 70 | |

FIG. 2

| No. | Raw material mixture (dry mass%) | | | | | | Dry pellets | | | Note |
|---|---|---|---|---|---|---|---|---|---|---|
| | Iron ore | Coal | Wheat flour | Bentonite | Organic binder* | NaOH | Moisture (%) | Drop test number (times)** | Crush strength (kg/Pellet) | Tumbler strength (-3.35mm, %) | |
| 1 | 77.02 | 21.02 | - | 1.00 | 0.10 | 0.02 | <0.1 | 3.2 | 9.5 | 18.5 | Comparative Sample |
| 2 | 78.43 | 21.37 | 1.2 | 0.2 | - | 0.02 | 8.0 | 0.2 | 0.6 | 80.8 | Comparative Sample |
| 3 | 78.43 | 21.17 | 1.2 | 0.2 | - | 0.02 | 3.4 | 0.7 | 1.9 | 27.0 | Comparative Sample |
| 4 | 78.27 | 21.13 | 1.2 | 0.2 | - | 0.02 | 0.5 | 8.4 | 9.1 | 3.3 | Inventive Sample |
| 5 | 78.11 | 21.09 | 0.8 | 0.2 | - | 0.02 | <0.1 | 6.6 | 14.5 | 3.4 | Inventive Sample |
| 6 | 77.95 | 21.05 | 1.0 | - | - | - | <0.1 | 6.4 | 14.5 | 3.5 | Comparative Sample |
| 7 | 77.95 | 21.05 | 1.0 | 0.2 | - | 0.02 | <0.1 | 9.8 | 18.8 | 2.5 | Inventive Sample |
| 8 | 77.56 | 20.94 | 1.5 | - | - | - | <0.1 | 16.4 | 18.8 | 1.5 | Comparative Sample |

*Organic binder: Sodium carboxy methyl cellulose
**Drop test number: Number of falling from the height of 45 cm

FIG. 3

| No. | Raw material mixture (dry mass%) | | | | | | Moisture (%) | Dry pellets | | | Note |
|---|---|---|---|---|---|---|---|---|---|---|---|
| | Iron ore | Coal | Corn flour | Dextrin | Potato starch | Bentonite | NaOH | | Drop test number (times*) | Crush strength (kg/Pellet) | Tumbler strength (-3.35mm, %) |
| 11 | 76.78 | 22.03 | 1.00 | - | - | 0.17 | 0.02 | <0.1 | 15.7 | 22.6 | 1.2 | Inventive Sample |
| 12 | 76.54 | 22.03 | 1.24 | - | - | 0.17 | 0.02 | <0.1 | 21.9 | 25.3 | 0.8 | Inventive Sample |
| 13 | 75.95 | 21.86 | 2.0 | - | - | 0.17 | 0.02 | <0.1 | 40.5 | 26.9 | 0.2 | Inventive Sample |
| 14 | 77.95 | 21.05 | - | 1.0 | - | - | - | <0.1 | 9.2 | 7.7 | 0.9 | Comparative Sample |
| 15 | 77.17 | 20.83 | - | 2.0 | - | - | - | <0.1 | 16.6 | 21.7 | 0.7 | Comparative Sample |
| 16 | 77.17 | 20.83 | - | - | 2.0 | - | - | <0.1 | 7.3 | 13.2 | - | Comparative Sample |

*Drop test number: Number of falling from the height of 45 cm

FIG. 4

| No. | Raw material mixture (dry mass%) | | | | | Dry pellets | | | Note |
|---|---|---|---|---|---|---|---|---|---|
| | Iron ore | Coal | Wheat flour | Bentonite | NaOH | Moisture (%) | Drop test number (times*) | Tumbler strength (-3.36mm, %) | |
| 17 | 76.56 | 22.2 | 1.2 | 0 | 0.02 | 0.2 - 0.4 | 10.1 | 4.8 | Comparative Sample |
| 18 | 76.64 | 22.2 | 1.2 | 0.08 | 0.02 | 0.2 - 0.4 | 13.3 | 1.2 | Inventive Sample |
| 19 | 76.72 | 22.2 | 1.2 | 0.16 | 0.02 | 0.2 - 0.4 | 14.8 | 0.8 | Inventive Sample |

Drop test number: Number of falling from the height of 45 cm

FIG. 5

| | T.Fe | Metal.Fe | Fe₂O₃ | FeO | SiO₂ | Al₂O₃ | CaO | MgO | C | Grain sizes (-75 μm) |
|---|---|---|---|---|---|---|---|---|---|---|
| | | | | | | | | | | Dry mass% |
| Converter dust | 40.0 | 0.8 | 36.8 | 18.4 | 1.4 | 0.4 | 20.1 | 1.7 | 1.6 | 77 |
| Wet blast dust | 33.1 | 0.0 | 42.7 | 4.1 | 4.4 | 2.6 | 3.3 | 0.2 | 34.5 | 62 |
| Dry blast dust | 31.6 | 0.0 | 35.6 | 5.0 | 5.7 | 2.5 | 3.0 | 0.2 | 36.4 | 28 |

FIG. 6

| No. | Raw material mixture (dry mass%) | | | | | | | Dry Pellets | | | Note |
|---|---|---|---|---|---|---|---|---|---|---|---|
| | Wet blast dust | Dry blast dust | Converter dust | Carbonaceous material** | Wheat flour | Bentonite | NaOH | Moisture (%) | Drop test number (times*) | Crush strength (kg/Pellet) | Tumbler strength (-3.35mm, %) | |
| 20 | 23.57 | 9.71 | 65.87 | 12.95 | - | 1.25 | - | <0.1 | 0.9 | 5.6 | 25.6 | Comparative Sample |
| 21 | 23.49 | 9.68 | 64.88 | 12.84 | - | 2.00 | - | <0.1 | 0.8 | 7.2 | 24.2 | Comparative Sample |
| 22 | 23.25 | 9.54 | 64.21 | 12.72 | - | 3.00 | - | <0.1 | 1.6 | 9.3 | 5.1 | Comparative Sample |
| 23 | 23.62 | 9.69 | 65.24 | 12.92 | 1.25 | 0.20 | - | <0.1 | 1.9 | 8.2 | 3.5 | Inventive Sample |
| 24 | 23.56 | 9.66 | 65.07 | 12.89 | 1.50 | 0.20 | - | <0.1 | 2.1 | 9.3 | 8.2 | Inventive Sample |
| 25 | 23.44 | 9.61 | 64.74 | 12.82 | 2.00 | 0.20 | - | <0.1 | 2.4 | 9.2 | 0.8 | Inventive Sample |
| 26 | 23.20 | 9.52 | 64.08 | 12.69 | 3.00 | 0.20 | - | <0.1 | 5.2 | - | 0.3 | Inventive Sample |

*Drop test number: Number of falling from the height of 45 cm
**Carbonaceous material: Total mass% of carbonaceous components which is counted in the blast dust content

FIG. 11

| NO. | RAW MATERIAL MIXTURE (DRY MASS %) | | | | | DRY PELLETS | | | | NOTE |
|---|---|---|---|---|---|---|---|---|---|---|
| | IRON ORE | COAL | WHEAT FLOUR (PROTEIN CONTENT) | ORGANIC BINDER | NaOH | MOISTURE (%) | DROP TEST NUMBER (TIMES) | CRUSH STRENGTH (kg/Pellet) | TUMBLER STRENGTH (-3.35mm, %) | |
| 27 | 77.93 | 21.04 | 1.00 (12%) | 0.01 | 0.02 | >0.1 | 3.3 | 5.0 | 14.0 | COMPARATIVE SAMPLE |
| 28 | 77.93 | 21.04 | 1.00 (8%) | 0.01 | 0.02 | >0.1 | 7.2 | 11.8 | 4.0 | INVENTIVE SAMPLE |
| 29 | 72.30 | 17.76 | 1.20 (5%) | — | — | >0.1 | 9.7 | 18.0 | 2.0 | INVENTIVE SAMPLE |

FIG.12

| | | | | | | MASS% |
|---|---|---|---|---|---|---|
| IRON ORE | T.Fe | FeO | SiO₂ | Al₂O₃ | MOISTURE | GRAIN SIZE (−75 μm) |
| | 67.73 | 29.4 | 4.54 | 0.21 | 9.5 | 96 |
| COAL | FIXED CARBON | VOLATILE COMPONENT | ASH | MOISTURE | GRAIN SIZE (−75 μm) | |
| | 77.83 | 17.48 | 4.69 | 1.2 | 84 | |
| LINE STONE | CaO | AVERAGE GRAIN SIZE | | | | |
| | 53.33 | 91 μm | | | | |
| DOLOMITE | CaO | MgO | AVERAGE GRAIN SIZE | | | |
| | 30.1 | 21.1 | 42 μm | | | |
| FLUORITE | CaF₂ | AVERAGE GRAIN SIZE | | | | |
| | 96.06 | 78 μm | | | | |

FIG.13

| IRON ORE | T.Fe | FeO | SiO$_2$ | Al$_2$O$_3$ | MOISTURE | GRAIN SIZE (-75μm) | MASS% |
|---|---|---|---|---|---|---|---|
| | 67.73 | 29.4 | 4.54 | 0.21 | 9.5 | 96 | |
| COAL | FIXED CARBON | VOLATILE COMPONENT | ASH | MOISTURE | GRAIN SIZE (-75μm) | | |
| | 71.6 | 19.6 | 8.8 | 7 | 67 | | |
| LIME STONE | CaO | AVERAGE GRAIN SIZE | | | | | |
| | 53.33 | 91 μm | | | | | |
| FLUORITE | CaF$_2$ | AVERAGE GRAIN SIZE | | | | | |
| | 96.06 | 78 μm | | | | | |

FIG.14

| NO. | RAW MATERIAL MIXTURE (DRY MASS %) | | | | | |
|---|---|---|---|---|---|---|
| | IRON ORE | COAL | WHEAT FLOUR (PROTEIN CONTENT) | LINE STONE | DOLOMITE | FLUORITE |
| 29 | 72.30 | 17.76 | 1.20 (5%) | 5.6 | 2.64 | 0.5 |
| 30 | 72.09 | 18.1 | 1.50 (8%) | 7.31 | — | 1 |

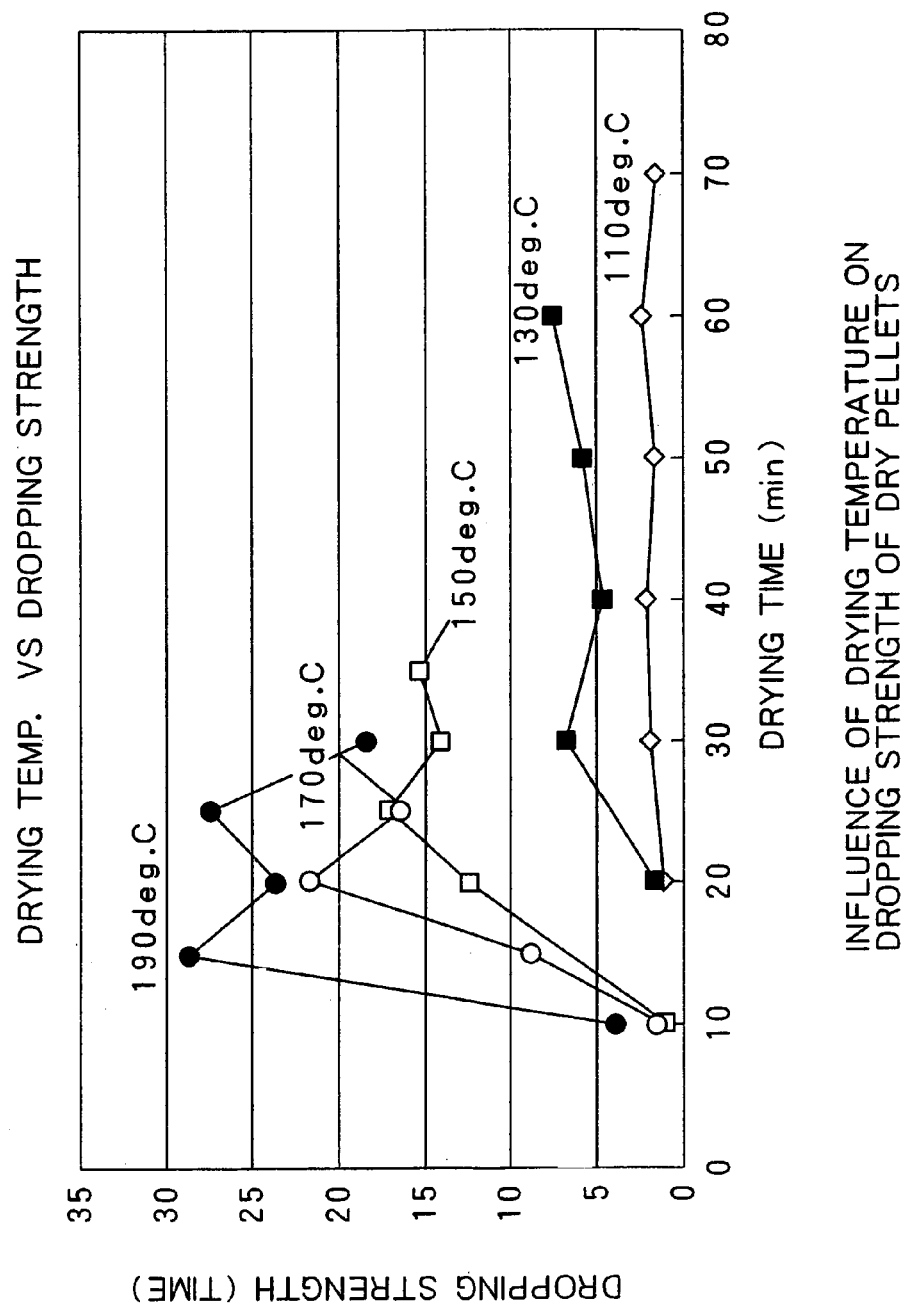

METHOD OF PRODUCING IRON OXIDE PELLETS

BACKGROUND OF THE INVENTION

1. Field of the Invention

The present invention relates to iron oxide pellets which are to be reduced in a rotary hearth furnace or the like and to a method of producing the iron oxide pellets. The present invention also relates to reduced iron pellets obtained through reduction of the iron oxide pellets and to a method of producing the reduced iron pellets.

2. Description of the Related Art

The Midrex method is a well-known method of producing reduced iron. In the Midrex method, a reducing gas produced from natural gas is fed through a tuyere into a shaft furnace and allowed to rise therein for reduction of iron ore or iron oxide pellets charged therein, to thereby produce reduced iron. However, since the method requires a supply, as a fuel, of a large amount of high-cost natural gas, the location of a plant utilizing the Midrex method is limited to a region producing natural gas.

In recent years, a certain type of methods for producing reduced iron has become of interest, in which instead of natural gas relatively inexpensive coal can be used as a reducing agent. An example of such a method is disclosed in U.S. Pat. No. 3,443,931. In this prior art technique, a mixture of a powder of iron ore and a carbonaceous material is pelletized, then reduced in a high-temperature atmosphere to thereby produce reduced iron. This method has the following advantages among others: Coal can be used as a reducing agent; a powder of iron ore can be used directly; reduction is performed at a high rate; and the carbon content of a product can be regulated.

However, since carbonaceous material has substantially no effects of binding pellet granules together, the strength of carbonaceous-material-containing iron oxide pellets is low as compared with that of pellets containing no carbonaceous material. If the strength of green pellets before drying is low, the pellets are crushed and pulverized in the handling during the drying process, resulting in a low yield of iron oxide pellets. Also, if the strength of iron oxide pellets after, drying is low, the pellets are crushed and pulverized when fed into a reducing furnace, resulting in a low yield of reduced iron. The pulverization occurring during feeding of the pellets also leads to lowered quality of reduced iron pellets.

Japanese Patent Publication (kokoku) No. 52-26487 discloses a prior art technique directed to improvement of the strength of reduced iron pellets in a reducing process and that of dried iron oxide pellets. In this prior art technique, bentonite (a coagulating agent) is added in an amount of 1 mass % or more to a combination of fine powder of ore material and a carbonaceous reducing agent, and the resultant mixture is kneaded with conditioning water prepared by dissolving a dispersing agent (0.3 mass % or less) in an organic binder such as starch, and granulated while an adequate amount of water is sprayed thereon, to thereby obtain pellets.

This prior art technique enables improvement of the strength of pellets, but has disadvantages as follows:

A first disadvantage will be described. Since bentonite serving as a coagulating agent has a property of swelling to a great extent, a large amount of water must be added during the pelletization step by use of a pelletizer. Addition of water leads to softening and easy deformation of pellets. The deformation hinders the ventilation of drying gas in the drying process so that a long time is required for attaining sufficient dryness. Further, since pellets deformed into a flat shape have low strength, the pellets are susceptible to crushing and pulverization when fed into a reducing furnace. In addition, as the bentonite content increases, the mean grain size of green pellets decreases.

Next will be described a second disadvantage. Since bentonite remains as an impurity in reduced iron pellets, the amount, of slag increases during steelmaking through reduction of reduced iron pellets. This means that the product value of the reduced iron pellets is lowered. In addition, the addition of bentonite increases the cost.

SUMMARY OF THE INVENTION

According to a first aspect of the present invention, there are provided iron oxide pellets which exhibit high strength after drying and have smaller amounts of impurities, and a method of producing the same.

According to a second aspect of the present invention, there is provided reduced iron pellets having a high degree of metallization at high yield, and a method of producing the same.

The present invention involves a method for producing a metal oxide agglomerated product comprising the steps of:

mixing raw material components comprising a metal oxide, a carbonaceous material, and an organic binder;

agglomerating the resulting raw material mixture to thereby obtain an agglomerated product; and drying the agglomerated product, wherein the protein content of the organic binder is 10 mass % or less.

The step of mixing raw material components comprises mixing the raw material components while adding water.

The step of agglomerating the resulting raw material mixture to thereby obtain an agglomerated product comprises performing the agglomeration while adding water.

The method further comprises the step of adding water to the raw material mixture.

The step of mixing raw material components comprises the steps of mixing raw material components having small moisture contents, and mixing a raw material component having a large moisture content to the raw material mixture.

The step of mixing raw material components having small moisture contents comprises performing the mixing of the raw material components while adding water.

The step of mixing raw material components having small moisture contents comprises mixing the raw material components while adding water so as to have a moisture content of 4-8 mass %.

The step of drying the agglomerated product is carried out at 80-220° C.

The step of drying the agglomerated product is carried out at 150-200° C.

An inorganic coagulant is included in the raw material components.

BRIEF DESCRIPTION OF THE DRAWINGS

FIG. 1 is a table showing the components contained in the iron ore and coal in Example 1;

FIG. 2 is a table showing the test results for the iron oxide pellets after drying in Example 1;

FIG. 3 is a table showing the test results for the iron oxide pellets after drying in Example 2;

FIG. 4 is a table showing the test results for the iron oxide pellets after drying in Example 4;

FIG. 5 is a table showing the components contained in the blast furnace dusts and converter dust in Example 5;

FIG. 6 is a table showing the test results for the iron oxide pellets after drying in Example 4;

FIG. 11 is a table showing the test results for the iron oxide pellets after drying in Example 7 and 8;

FIG. 12 is a table showing the properties of iron oxide, coal and additives in Example 8;

FIG. 13 is a table showing the properties of iron oxide, coal and additives in Example 8 and 9;

FIG. 14 is a table showing the mixing ratios of iron ore, coal, organic binder and additives in Example 8 and 9;

FIG. 15 is a graph showing the influence of drying temperature on dropping strength of dried pellets; and FIG. 16 is a graph showing the relation between pellet temperature and pellet moisture content in pellet drying process.

DESCRIPTION OF THE PREFERRED EMBODIMENTS

Figure 7:
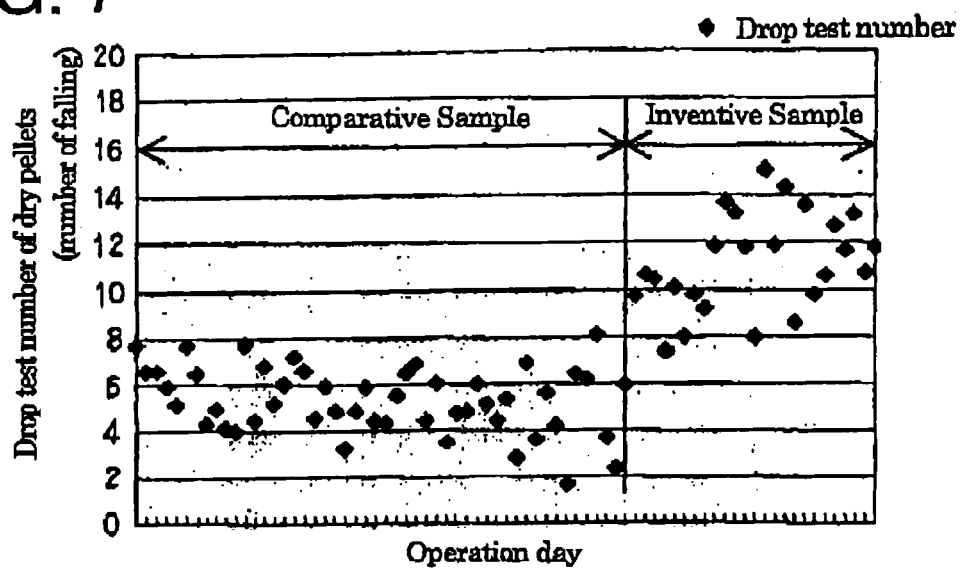
FIG. 7 is a graph showing the distribution of the drop test number as determined under actual operation conditions for the dry carbonaceous-material-containing iron oxide pellets according to the present invention as described in Example 3.

Next will be described a method for producing a metal oxide agglomerated product according to a preferred embodiment of the present invention.

First, a raw material mixture according to the present preferred embodiment contains a metal oxide as the main component, a carbonaceous material for reducing the metal oxide, and an organic binder for binding together the metal oxide and the carbonaceous material. In the following embodiment, iron oxide is used as the metal oxide, and iron oxide pellet as the metal oxide agglomerated product.

As the iron oxide serving as the main component of the raw material mixture, there may be used mill scale or powder of iron ore. Also, blast furnace dust, converter dust, dust from a sintering process, electric furnace dust, or mixtures thereof may be used as the same. Since these dusts contain carbonaceous components, addition of supplemental carbonaceous material is not required as long as the amount of the carbonaceous components is sufficient for reducing the iron oxide to a desired reduction rate. As the oxide metal, nonferrous metals containing oxides of Ni, Mn, Mo, Ti and the like may be also used.

The carbonaceous material of the present embodiment serves as a reducing agent necessary for achieving reduction of the iron oxide contained in the iron oxide pellets by use of a reducing furnace. Therefore, the components of the carbonaceous material are not particularly limited so long as they contain carbon. Examples of the carbonaceous material usable in the present embodiment include coal, cokes, charcoal, and carbon-containing blast furnace dust, and a carbonaceous material of waste such as waste toner, waste plastics, biomass or domestic garbage.

The amount of the added carbonaceous material in the present embodiment is determined so that it is sufficient for reducing the iron oxide. The actual amount of addition depends on the desired qualities of the desired reduced iron pellets, such as iron oxide content in iron oxide pellets, fixed carbon content in carbonaceous material, and degree of metallization and residual carbon ratio after reduction. Generally, the amount of addition falls within the range of 10-30 mass %. If the amount of addition is less than 10 mass %, sufficient effects of the reducing agent are not obtained. If the amount of addition exceeds 30 mass %, the strength of the iron oxide pellets is lowered after drying and the content of carbonaceous material therein becomes excessive, which is economically undesirable.

The organic binder of the present embodiment is added to the raw material mixture in order to increase the strength of the iron oxide pellets after drying. The material of the organic binder is not particularly limited, and there may be advantageously used wheat flour, corn flour, potato starch, dextrin, or the like. The starchy component of the organic binder is water-soluble, and an aqueous solution thereof spreads over the particle surfaces of the iron oxide and carbonaceous material, resulting in a decreased amount of added water.

Of materials usable as the organic binder, wheat flour, corn flour, and potato starch have the main starchy components. After addition of water, these starchy components start to become paste at 50-60° C. under heat, and the viscosity thereof reaches a peak at 80-90° C. Meanwhile, dextrin is a material modified from the starchy component, and exerts binding power in a paste form when water is added thereto. In the present invention, utilization of the binding effects of the organic binder results in binding firmly together the iron oxide and the carbonaceous material contained in the raw material mixture for production of iron oxide pellets.

The starch contained in the organic binder dissolves in water to form a aqueous solution which spreads over the particle surfaces of the iron oxide and the carbonaceous material under pelletization, and becomes a paste when the temperature rises under drying, whereby the resultant iron oxide pellets obtain an increased strength. When the temperature rises further, the moisture is evaporated so that the viscous gel starch is solidified. As a result, there increases the binding strength of the particles of the iron oxide and the carbonaceous material. If the green pellets are dried until they attain such conditions, there are obtained iron oxide pellets having a sufficient strength which raises no problems in handling during the reducing process. However, if the starch is dried at a temperature of 220° C. or more, it starts to burn, resulting in a reduced strength of the resultant pellets. Therefore, the starch is preferably dried within the temperature range of 80-220° C.

The amount of added organic binder is determined such that it is sufficient for binding the iron oxide and the carbonaceous material together. Generally, the amount is 5 mass % or less. Even if the amount exceeds 5 mass %, the binding effect is not further increased and disadvantages in economy may result, since the effects of the binder have been saturated. The amount providing the optimum effects of the binder is within the range of 1-2 mass %. If the organic binder is added in this range, the pellets obtain a sufficient strength after drying.

When wheat flour is used as the organic binder, the properties of wheat flour greatly depend on the protein content of wheat flour that is the material. In general, protein-rich wheat flour is hard, and its grain size is rough when pulverized. Meanwhile, protein-poor wheat flour is soft, and its grain size is fine when pulverized. Wheat flour is mainly composed of protein and carbohydrate, and starch is contained in the carbohydrate. Accordingly, when wheat flour with a small protein content is used as the organic binder, the strength after drying of the metal oxide-containing agglomerated product is remarkably improved, compared with the use of wheat flour with a large protein content. When wheat flour rich in carbohydrate is used, the strength after drying of the metal oxide-containing agglomerated product is remarkably improved. This is attributable to that the starch contained in the wheat flour with a small protein content is easily gelatinized because of its fine grain size. The protein content is preferably 10% or less, more preferably 8% or less.

The inorganic coagulating agent of the present embodiment is used for increasing the strength of the iron oxide pellets after drying, maintaining the binding power under heat at high temperature, increasing the strength of the reduced iron pellets after reduction, and improving the yield of the reduced iron pellets. The material of the inorganic coagulating agent is not particularly limited so long as such functions are exerted, and bentonite, silica flour, or the like may be advantageously used.

If a small amount of bentonite whose particle size is much smaller than that of iron oxide and that of carbonaceous material is added to the iron oxide pellets under production, the particles of the bentonite enter the spaces between the particles of iron oxide and carbonaceous material. Serving as an aggregate in the paste of the starch generating from the organic binder, the bentonite particles augment the binding force between particles of iron oxide and carbonaceous material so as to enhance the strength of iron oxide pellets after drying.

Bentonite contains sodium and potassium, in addition to silicon dioxide and alumina. Therefore, bentonite is melted to become sodium silicate and the like under heat at high temperature of 1000-1200° C. in a reducing process where the starch loses its binding power, whereby the binding power in the iron oxide pellets is maintained.

However, as the amount of added bentonite increases, the quality of iron oxide pellets decreases. Also, since bentonite has a swelling property, when water is added thereto, it rapidly produces seeds which serve as the cores for binding. As a result, the pelletization rate of the oxidized pellets is lowered, and a large amount of water is require for pelletization. Further, drying efficiency is decreased since green pellets become soft and deformed. Moreover, the deformation of the pellets in turn deteriorates the strength of iron oxide pellets after drying. Therefore, in the present invention, the amount of added inorganic coagulating agent such as bentonite is not less than 0.05 mass % and less than 1 mass %. The amount of 0.05 mass % is the lower limit at which the inorganic coagulating agent can exert its binding effects.

More advantageously, the amount of added inorganic coagulating agent is 0.08 mass % or more and 0.9 mass % or less. If the amount is excessive, not only do impurities increase but also the cost, and the amount is preferably 0.5 mass % or less. More preferably, the amount is 0.1-0.3 mass %, since the effects of the inorganic coagulating agent are sufficiently exerted and the amount of migrated impurities is sufficiently lowered.

In the present embodiment, dispersants having surface-activating effects may be added to green pellets in an amount of 0.1 mass % or less. As the dispersant, there may be used sodium hydroxide or alkylbenzene surfactant.

If sodium hydroxide serving as a dispersant is added to green pellets, the hydrophobic carbonaceous material is transformed into a hydrophilic carbonaceous material so that moisture adequately permeates the spaces between the particles of the iron oxide and the carbonaceous material. In this case, the binding between the particles of iron oxide and carbonaceous material is strengthened due to the moisture existing between the particles.

The amount of added dispersant such as sodium hydroxide is determined such that it is sufficient for transforming the hydrophobic carbonaceous material into a hydrophilic carbonaceous material. Since an amount in excess of that needed leads to corrosion of facilities and the like, the amount is preferably 0.1 mass % or less. In practice, the amount is advantageously approximately 0.01-0.03 mass %.

The diameter (size) of green pellets before drying, is preferably 30 mm or less and made uniform by use of a sieve such as a roller screen, so that stable pelletization can be performed at a constant palletizing rate. Also, the diameter is preferably 6 mm or more in terms of handling in a reducing furnace. As the diameter of iron oxide pellets becomes large, the mass of the iron oxide pellets becomes large, resulting in decreased drop test number. Further, an excessively large diameter lowers the reaction rate of reduction in a reducing furnace. For these reasons, the diameter of green pellets is preferably 15-25 mm. In actual operation conditions, the diameter is most preferably 17 mm±3 mm and uniform. In this context, the range of the particle size precisely represents the range within which most particles (for example, 99%) fall. Needless to say, a slight amount of particles falling outside the range is contained in the green pellets.

The strength of iron oxide pellets after drying is determined according to the tumbler strength, which shows a close correlation with the pulverization rate in actual operation conditions. In the present embodiment, the tumbler strength T150 index can be made 5 mass % or less. The tumbler strength T150 index is obtained in accordance with the reduction and pulverization test for iron ores (sintered ore) described in Section 10.7 of "Iron Manufacture Handbook 1979." In this test, about 100 g of dry pellets is placed in a metallic container comprising a cylinder having an inner diameter of 12.66 cm and a length of 20 cm, with two partition plates having a height of 2.5 cm and a thickness of 0.6 cm disposed in the longitudinal direction therein such that they face each other; thereafter the pellets are rotated 50 times at 30 rpm; subjected to sieving; and the mass % of the separated pellets having a size of 3.55 mm or less is measured. The smaller the value of mass %, the higher the strength of the dried pellets.

The metal oxide agglomerated produce may have a briquet, tablet, sheet or bar-like shape, in addition to the pellet described above.

Next will be specifically described the method of producing iron oxide pellets according to the present embodiment of the present invention. First, in a mixer there is uniformly mixed a material containing an iron oxide as the main component, a sufficient amount of a carbonaceous material for reducing the iron oxide, a sufficient amount of an organic binder for binding together the iron oxide and the carbonaceous material, and an inorganic coagulating agent in an amount of not less than 0.05 mass % and less than 1 mass %. Next, after addition of water, the raw material mixture is pelletized into green pellets by use of a pelletizer. The pellets have a diameter of 6-30 mm and a moisture content of 11-14 mass %. Subsequently, the green pellets are charged in a drier and dried at 80-220° C. in a dryer until the moisture content becomes 1.0 mass % or less.

The amount of added water to green pellets is preferably 11-14 mass %. If the amount is less than 11 mass % the green pellets are difficult to pelletize by use of a pelletizer, whereas if the amount exceeds 14 mass % the green pellets become soft and flat in shape. As a result, the strength of the green pellets is lowered, and drying the green pellets takes a long time. Therefore, the amount of added water is preferably within the range of 11-14 mass %, with respect to the raw material mixture. Water may be added in the mixing process through the mixer and in the pelletization process through the pelletizer. Further, remixing may be performed while adding water after mixing once or after adding water.

The green pellets are preferably dried at 80-220° C. The main component of the organic binder is starch, and the starch comprises amylose and amylopectin. Amylose is soluble to water, while amylopectin swells and turns into a paste by absorbing water when heated in the presence of water. Since the gelatinization starts at 50-60° C., and the viscosity is maximized at 80-90° C., the starch contained in the organic binder does not sufficiently turn into a paste if the drying temperature of the green pellet is lower than 80-90° C. Further, the extended time for drying the green pellets causes the phenomenon that the drying progresses before the temperature rises to a degree necessary for gelatinization, so that the gelatinization cannot be developed at a temperature where the viscosity is maximized because of shortage of water. A dog temperature of 80-90° C. or higher is preferable to enhance the strength of the green pellets because the moisture left in the green pellets is more than at a lower drying temperature even with the same green pellet temperature to promote the gelatinization. However, if the drying temperature exceeds 220° C., the organic binder starts to burn, resulting in no effects of the binder. Therefore, the viscosity of the organic binder can be stably maximized while preventing the burning of the organic binder, more preferably within the range of 150-200° C., and the strength of the green pellets can be improved. The temperature may be regulated by use of exhaust gas, heat-exchanged air or nitrogen gas, or the like. The gas used for drying is not particularly limited.

The moisture content of the green pellets must be 1.0 mass % or less after drying. This is because if the moisture is 1.0 mass % or less, the strength of iron oxide pellets increases drastically. If moisture remains in amounts in excess of 1.0 mass %, there cannot be obtained a sufficient strength which enable the pellets to endure the handling operation and the like.

The addition to the raw material mixture of an inorganic coagulating agent such as bentonite is difficult when the raw material mixture contains moisture, since bentonite and the like have swelling properties. Therefore, bentonite in the form of dry powder is added to the raw material mixture comprising iron oxide, carbonaceous material, and organic binder. The resultant mixture in the form of powder is mixed uniformly by use of a mixer, followed by addition of water.

In the case where a dispersant such as sodium hydroxide is added to the raw material mixture, the following procedure may be performed: sodium hydroxide in a solid state is added to the raw material mixture, followed by mixing uniformly by use of a mixer, and water is subsequently added thereto. Alternatively, the raw material mixture components other than sodium hydroxide are mixed first, and thereafter a solution of sodium hydroxide is added thereto and the raw material mixture is mixed by use of a mixer.

When a small amount of a raw material component with low moisture content is mixed to a raw material component with high moisture content, the component with low moisture content tends to be locally aggregated without being uniformly dispersed. Therefore, only raw material components with low moisture contents such as a carbonaceous reducing agent such as coal or cokes, a sub-raw material component such as limestone, dolomite or fluorite, and a binder such as organic binder are mixed together, and a raw material component rich in water, for example, iron ore powder is then mixed thereto, whereby the raw material components can be more uniformly mixed. The phenomenon that the raw material components with low moisture contents are locally aggregated without being uniformly dispersed can be prevented by such a two-stage mixing, and a satisfactory uniform mixing can be realized. Addition of water is not needed when the water content contained in the raw material components rich in water is sufficient. When the moisture content of the raw material components in mixing is too low, the phenomenon that air is entangled into the raw material powder layer within the mixture to remarkably decrease the bulk density of raw material (the volume increases) may be caused. To prevent this phenomenon, for example, water is desirably added so that the moisture content is 4-8%.

Next will be specifically described the method of producing reduced iron according to an embodiment of the present invention.

The above-mentioned iron oxide pellets are reduced by use of a reducing furnace. The type of the reducing furnace is not particularly limited so long as the furnace is capable of reducing iron oxide, and there may be used, for example, a rotary kiln or a grate kiln.

Dried iron oxide pellets are temporarily accommodated in hoppers so as to absorb variation in yield of pelletization with a pelletizer. Subsequently, the pellets are fed into a rotary hearth furnace, and reduced at a furnace temperature of 1100-1450° C. with carbonaceous material contained in the iron oxide pellets. Alternatively, the pellets may be directly fed into the rotary hearth furnace from the drier without accommodation in the hoppers. The reducing temperature may be a generally-practiced reducing temperature, and a reducing time about 8-10 minutes is sufficient.

In the embodiments of the present invention, since the iron oxide pellets have high strength, they are difficult to crush and pulverize when fed into a rotary hearth furnace, resulting in a low pulverization rate of the reduced iron pellets removed from inside the furnace after reduction. Further, the amount of the inorganic coagulating agent, which is an impurity, is small, resulting in a high degree of metallization. Moreover, a rotary hearth furnace is preferably used since no load or impact is exerted on pellets therein.

EXAMPLES

Example 1

The iron ore (material of iron oxide) and coal (carbonaceous material) containing the components shown in FIG. 1 were mixed in a mixer at the mixing ratios shown in FIG. 2. Water was added to each of the resultant raw material mixtures, and the mixture was pelletized into green pellets having a moisture content of 12-14 mass %, by use of a pelletizer equipped with a disk having a diameter of 0.9 m. After the pelletization, the green pellets having a diameter of 16-19 mm were passed through a sieve, dried at a pellet temperature of 110° C. for 15-24 hours in an electric thermostat chamber, and cooled, to thereby obtain dry iron oxide pellets. A comparative test was performed for each group of resultant iron oxide pellets. The moisture content and test results are shown in FIG. 2.

However, the pellets of Comparative Sample Nos. 2 and 3, and Inventive Sample No. 4 were dried for a shorter time than were the pellets of the other samples, in order to investigate the relationship between moisture content and strength of the pellets. The pellets of Comparative Sample No. 1 contained no wheat flour. The pellets of Comparative Sample Nos. 6 and 8 contained no bentonite.

The strength of iron oxide pellets was evaluated for drop test number, crush strength, and tumbler strength T150 index. The drop test number shown in Table 2 represents the number of falling from the height of 45 cm to the horizontal surface of an iron plate during which the iron oxide pellet did not shatter and maintained its original shape.

As shown in FIG. 2, since the pellets of Comparative Sample No. 1 contained no organic binder such as wheat flour, the drop test number was 3.2, crush strength was 9.6 kg/pellet, and tumbler strength T150 index was 18.5 mass %.

Since the pellets of Comparative Sample Nos. 2 and 3 had a moisture content exceeding 1 mass % after drying, tumbler strength T150 index was deteriorated. Since the pellets of Comparative Sample No. 4 had a moisture content exceeding 0.5 mass % after drying, tumbler strength T150 index was improved. That is, when the moisture content was lowered after drying, tumbler strength T150 index was improved; i.e., when the moisture content was 1 mass % or less after drying, tumbler strength T150 index was 5 mass % or less. The test results for the pellets of Inventive Sample Nos. 5 and 7, and the pellets of Comparative Sample Nos. 6 and 8 varied with the amount of added wheat flour. The pellets of Comparative Sample No. 6, which contained 1.0 mass % wheat flour, had a drop test number of 6.4, a crush strength of 14.5 kg/pellet, and a tumbler strength T150 index of 3.5 mass %. The pellets of Comparative Sample No. 8, which contained, 1.5 mass %, wheat flour, exhibited further improved strength after drying. As is apparent from the comparison between the pellets of Comparative Sample No. 6 and those of Inventive Sample No. 7, through addition of 0.2 mass % bentonite and 0.02 mass % sodium hydroxide as well as wheat flour, the strength of the iron oxide pellets after drying and the strength of the green pellets were further increased, whereby crushing and pulverization of the green pellets during the handling before drying were prevented.

Lastly, the pellets of Comparative Sample Nos. 6 and 8 exhibited sufficient strength in a dry state; however, they exhibited insufficient strength at high temperature in a reducing furnace.

Example 2

The sample pellets of Example 2 contained corn flour, dextrin, or potato starch, instead of wheat flour serving as an organic binder. The iron ore and coal containing the components shown in FIG. 1, and the components shown in FIG. 3 were mixed in a mixer at the mixing ratios shown in FIG. 3, and the mixture was pelletized and dried according to the method used in Example 1, to thereby obtain samples of iron oxide pellets. A comparison test for investigating the properties of pellets was performed on each group of the iron oxide pellets. The moisture content and test results are shown in FIG. 3. The diameter of the green pellets was 16-19 mm.

As shown in FIG. 3, the iron oxide pellets containing corn flour, dextrin, or potato starch exhibited improvement in both drop test number and tumbler strength T150 index, as compared with the pellets which contained a conventional organic binder containing CMC serving as the main component and bentonite (Comparative Sample No. 1 in FIG. 2), although the pellets of Sample No. 14 exhibited a somewhat low crush strength. As is apparent from this Table, corn flour, dextrin, and potato starch may be used as a organic binder instead of wheat flour.

In the strict sense, the pellets of Sample Nos. 14-16 are not the examples of the present invention, since they contain neither bentonite nor sodium hydroxide. However, it is apparent that the same effects are obtained if corn flour, dextrin, or potato starch is used as an organic binder instead of wheat flour.

Example 3

Example 3 is drawn to the pellets obtained through a continuous operation. To the iron ore shown in FIG. 1 was added the coal (20-22 mass %) shown in FIG. 1, wheat flour (1.2 mass %), bentonite (0.2 mass %), and sodium hydroxide (0.02 mass %), and the mixture was mixed uniformly in a mixer, to thereby obtain a mixed material. After addition of water, the mixture was fed to a disc-type pelletizer, and pelletized continuously into green pellets having a moisture content of 12-13 mass %. After pelletization, the green pellets were passed through a roller screen, to thereby take up green pellets having a diameter of 16-20 mm. The green pellets were continuously dried in a through-flow dryer (exhaust gas: 180° C.) until the moisture content fell below 1 mass %, to thereby produce iron oxide pellets. The surface temperature of the pellets was 150-170° C. at the exit of the dryer.

As the comparative sample, there were produced iron oxide pellets containing CMC (carboxymethylcellulose-Na) (0.1 mass %), bentonite (0.8 mass %), and sodium hydroxide (0.02 mass %).

The iron oxide pellets produced according to the method of the present invention and the iron oxide pellets serving as the comparative sample were produced in an actual operation, and the strength distributions were observed. The results are shown in FIGS. 7 and 8.

Figure 8:
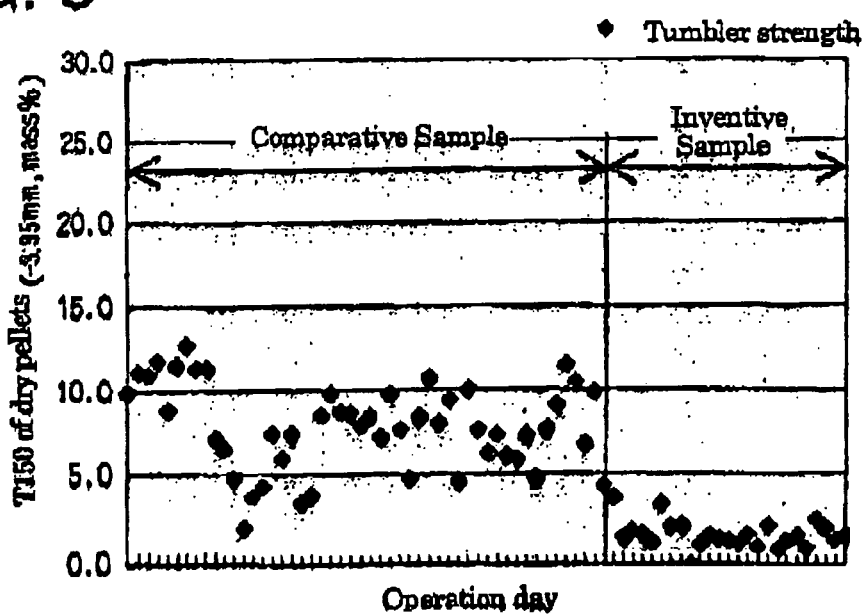
FIG. 8 is a graph showing the distribution of tumbler strength T150 index as determined under actual operation conditions for the dry carbonaceous-material-containing iron oxide pellets according to the present invention as described in Example 3.

As shown in FIG. 7, the drop test number of the iron oxide pellets produced according to the method of the present invention was 12 on average, which represents a vast improvement as compared to 5 in the case of the iron oxide pellets of the comparative sample. Also, as shown in FIG. 8, the tumbler strength T150 index of the iron oxide pellets produced according to the method of the present invention was 2 mass %, which represents a vast improvement as compared to 7 mass % in the case of the iron oxide pellets of the comparative sample. Furthermore, the iron oxide pellets produced according to the method of the present invention maintained stable strength over a prolonged period.

Example 4

Example 4 shows the effects of bentonite, which is an inorganic coagulant, on the strength of dry pellets.

Iron ore and coal containing the components shown in FIG. 1 and the components shown in FIG. 4 were mixed in a mixer at the mixing ratios shown in FIG. 4. After addition of water, each mixture was fed to a disc-type pelletizer, and pelletized into green pellets having a moisture content of 12-13 mass %. After pelletization, the green pellets were passed through a roller screen, to thereby take up green pellets having a diameter of 16-20 mm. The green pellets were dried in a through-flow dryer (exhaust gas: 180° C.) until the moisture content fell below 1 mass %, to thereby produce iron oxide pellets. The surface temperature of the pellets was 150-170° C. at the exit of the dryer. The thus-produced iron oxide pellet according to the method of the present invention were investigated for their strength. The moisture contents and the investigation results are shown in FIG. 4, and the relationship between bentonite content and strength is shown in FIG. 9.

Figure 9:
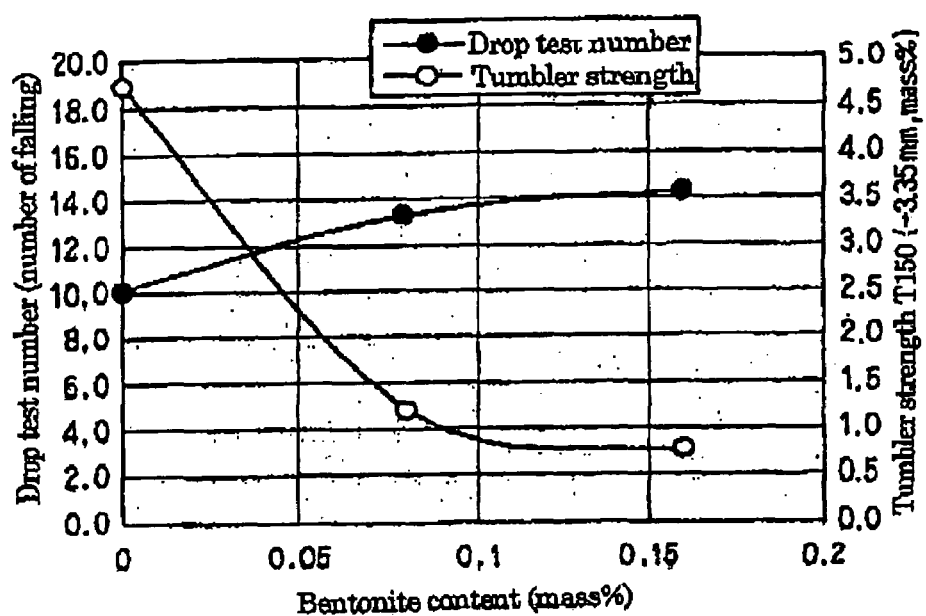
FIG. 9 is a graph showing a relationship between the amount of bentonite and strength in Example 4.

As shown in FIG. 9, the strength, especially the strength measured according to tumbler T150 strength index, of dried pellets was increased through addition of a small amount of a mixture of bentonite and wheat flour. Also, since bentonite has a swelling property, a large amount of water is required in the pelletization by use of a pelletizer, resulting in a decreased strength of green pellets. Therefore, addition of water should be avoided. Preferably, the amount of added bentonite is 0.1-0.3 mass %.

Example 5

The sample pellets of Example 5 were produced by use of converter dust and two types of blast furnace dust instead of iron ore serving as the source of iron oxide. The converter dust and blast furnace dusts shown in FIG. 5 and the components shown in FIG. 6 were mixed in a mixer at the mixing ratios shown in FIG. 6. Water in an amount of 4-5 mass %, was added to each of the resultant mixed materials. The mixture was fed to a pelletizer equipped with a disk having a diameter of 0.9 m, and pelletized into green pellets having a moisture content of 13-14 mass %. After pelletization, the green pellets were passed through a sieve and those having a diameter of 16-20 mm were dried at 110° C. for 15-20 hours in an electric thermostat chamber, followed by cooling, to thereby obtain dry pellets. A comparison test for investigating the properties of pellets was performed on each group of the iron oxide pellets. The moisture of the dry pellets and test results are shown in FIG. 6. In Example 5, since the carbonaceous components contained in the blast furnace dusts acted as a reducing agent, no additional carbonaceous material was incorporated. Therefore, the amount of carbonaceous material shown in FIG. 6 represents the carbon content in the blast furnace dust.

As shown in FIG. 6, the pellets of Inventive Sample Nos. 23-2e in which converter dust or blast furnace dusts were used as the main components (iron oxide sources) exhibited sufficient strength of pellets after drying. In the cases where these dusts are used, no addition of sodium hydroxide is required since coal is not used as a reducing agent.

Example 6

Figure 10:
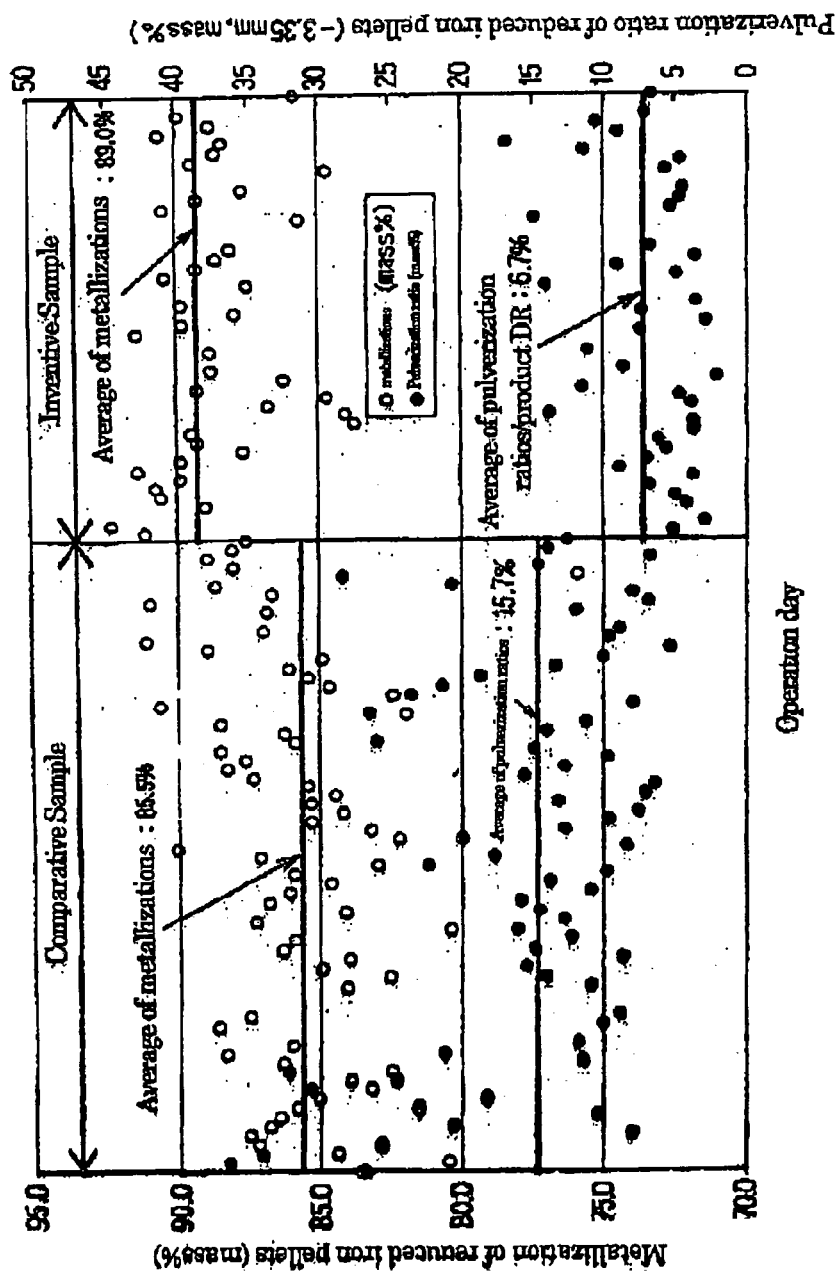
FIG. 10 is a chart showing the degree of metallization and the pulverization rate of the reduced iron pellets in Example 6.

Each of the same two samples of dry carbonaceous-material-containing iron oxide pellets as used in Example 3 was fed into a rotary hearth furnace having a furnace temperature of 1100-1450° C., and two samples of reduced iron pellets were produced. The degree of metallization and the pulverization rate of these samples are shown in FIG. 10.

Since the strength of the iron oxide pellets produced according to the present invention was improved as shown in FIGS. 7 and 8 in connection with Example 3, there was decreased the amount of small pieces and powder which were generated at the time of feeding of the iron oxide pellets into a rotary hearth furnace. The results are shown in FIG. 10. The pulverization rate of the reduced iron pellets of the inventive sample was half or less that of the comparative sample. The pulverization rate is represented by mass % of particles that have passed through a 3.85 mm sieve.

Since small pieces and powder which were generated at the time of feeding of the iron oxide pellets into a rotary hearth furnace have a specific surface area larger than that of the pellets, they are re-oxidized in the furnace after reduction, and the degree of metallization thereof is decreased accordingly. Also, since the small pieces and powder are small particles, in many cases the pellets block them from radiation and thus the radiation heat in the furnace does not easily reach the small particles. Further, a reducing gas is difficult to retain in the small pieces and powder, and therefore the small pieces and powder were discharged while being insufficiently reduced. Therefore, the degree of metallization of small pieces and powder is 20-50% lower than that of the pellets. In the present invention, since the amount of generated small pieces and powder to be discharged from the furnace after reduction is reduced, the metallization of the reduced iron including the small pieces and powder thereof is increased to 85.5-89.0%.

Example 7

Production of sample pellets was executed by use of the same iron ore, coal and organic binder as in Example 1 wherein wheat flour was used as the organic binder, while varying the protein content of the wheat flour. The oxide iron pellets obtained by mixing the iron ore and coal shown in FIG. 1 in the mixing ratios shown in FIG. 11, and performing palletizing and drying according to the method of Example 1 were comparatively tested for properties. The moisture content and test result of the dry pellets are shown in FIG. 11. As shown in FIG. 11, the strength of the oxide iron pellets was varied depending on the protein content of wheat flour. Compared with test No. 27 (comparative sample) using wheat flour with a protein content of 12%, test No. 28 (inventive sample) using wheat flour with a protein content of 8% is remarkably improved in drop test number, crush strength, and tumbler strength. Accordingly, the protein content is preferably 10% or less, more preferably 8% or less.

Example 8

The additives such as iron ore, coal, limestone and the like having properties shown in FIG. 12 were used, and wheat flour was used as the organic binder. To mix the materials, two-stage mixing was carried out. Namely, among the materials to be used, only coal, wheat flour, limestone, dolomite and fluorite having relatively small water contents were mixed in the first stage, the iron ore having a relatively large water content of the materials to be used was added to the resulting mixture in a mixing ratio shown in FIG. 14, and green pellets having a water content of 12-14 mass % were formed by use of a disc type pelletizer. The green pellets sieved to diameters of 16-19 mm after pelletization were dried at a pellet temperature of 110° C. for 15-24 hours in an electric thermostatic oven followed by cooling to thereby obtain dried iron oxide pellets. As shown in FIG. 11, test No. 29 of this example is apparently improved in strength, compared with test No. 27 with a high protein content or test No. 28 where no two-stage mixing is carried out.

Example 9

The iron ore, coal and additives having properties shown in FIG. 13 were used, and wheat flour was used as the organic binder. The iron ore, coal, wheat flour, limestone and fluorite were mixed at mixing ratios shown in FIG. 14 (test No. 30), and water was added to the raw material mixture followed by mixing again to pelletize green pellets having a moisture content of 12-14 mass %. The green pellets sieved to diameters of 16-19 mm after pelletizing were dried in an electric thermostatic oven while varying the oven temperature and the drying time, followed by cooling to obtain dried iron oxide pellets. The drop test number of the dried pellets is shown in FIG. 15. The change in strength (drop test number) after drying of the molded product was examined while varying the drying temperature. As shown in FIG. 15, the strength is improved according to the rise of drying temperature, and particularly suddenly enhanced at 150° C. or higher. FIG. 16 shows the experimental values of the relation between the temperature and moisture of the pellet at different drying temperatures of 130° C. and 180° C. It is found that the moisture left in the pellet is larger at the same pellet temperature as the drying temperature is higher, which is advantageous for gelatinization of starch.

The entire disclosure of Japanese Patent Application No. 9-298479 filed on Oct. 30, 1997 including specification, claims, drawings and summary are incorporated herein by reference in its entirety.

We claim:

1. A method for producing and using a metal oxide agglomerated product comprising the steps of:
    mixing raw material components at least comprising a metal oxide, a carbonaceous material and an organic binder, where the carbonaceous material comprises at least one selected from the group consisting of coal, coke, charcoal and carbon-containing blast furnace dust;
    agglomerating the resulting raw material mixture to thereby obtain an agglomerated product;
    drying the agglomerated product; and
    heating the agglomerated product to produce a reduced metal from the metal oxide,
    wherein the protein content of the organic binder is less than 10 mass %.

2. The method according to claim 1, wherein the step of mixing raw material components comprises mixing the raw material components while adding water.

3. The method according to claim 1, wherein the step of agglomerating the resulting raw material mixture to thereby obtain an agglomerated product comprises performing the agglomeration while adding water.

4. The method according to claim 1, which further comprises the step of adding water to the raw material mixture.

5. The method according to claim 1, wherein the step of mixing raw material components comprises the steps of mixing raw material components having small moisture contents, and mixing a raw material component having a large water content to the resulting raw material mixture.

6. The method according to claim 5, wherein the step of mixing raw material components having small moisture contents comprises mixing the raw material components while adding water.

7. The method according to claim 6, wherein the step of mixing raw material components having small moisture contents comprises mixing the raw material components while adding water so as to have a moisture content of 4-8 mass %.

8. The method according to claim 1, wherein the step of drying the agglomerated product is carried out at 80-220°C.

9. The method according to claim 1, wherein the step of drying the agglomerated product is carried out at 150-200°C.

10. The method according to claim 1, wherein an inorganic coagulant is included in the raw material components.

11. A method for producing and using a metal oxide agglomerated product comprising the steps of:
    mixing raw material components at least comprising a metal oxide, a carbonaceous material and an organic binder;
    agglomerating the resulting raw material mixture to thereby obtain an agglomerated product;
    drying the agglomerated product; and
    heating the agglomerated product to produce a reduced metal from the metal oxide, wherein
    the protein content of the organic binder is less than 10 mass %; and
    the metal oxide and the carbonaceous material are blast furnace dust, converter dust, dust from a sintering process, electric furnace dust, or a mixture thereof.

12. The method according to claim 1, wherein the metal oxide comprises iron oxide.

13. The method according to claim 1, wherein the organic binder contains a starchy component.

14. The method according to claim 1, wherein the organic binder comprises at least one selected from the group consisting of wheat flour, corn flour, potato starch and dextrin.

15. The method according to claim 1, wherein the organic binder comprises wheat flour.

16. The method according to claim 10, wherein the inorganic coagulant is selected from the group consisting of bentonite and silica flour.

17. The method according to claim 10, wherein the raw material components comprise the inorganic coagulant in an amount, X, such that 0.05 mass % $\leqq$ X <1 mass %.

18. The method according to claim 1, wherein after the drying the agglomerated product has a moisture content of 1.0 mass % or less.

* * * * *

UNITED STATES PATENT AND TRADEMARK OFFICE
CERTIFICATE OF CORRECTION

| | |
|---|---|
| PATENT NO. | : 7,438,730 B2 |
| APPLICATION NO. | : 11/378269 |
| DATED | : October 21, 2008 |
| INVENTOR(S) | : Yasuhiko Igawa et al. |

It is certified that error appears in the above-identified patent and that said Letters Patent is hereby corrected as shown below:

On the title page, Item (73) should read:

--(73) Assignee:   Kabushiki Kaisha Kobe Seiko Sho (Kobe Steel, Ltd.),

Kobe-shi (JP);--.

The bottom of the title page should read:

--18 Claims, 15 Drawing Sheets--.

Signed and Sealed this

Third Day of February, 2009

JOHN DOLL
*Acting Director of the United States Patent and Trademark Office*